United States Patent  
Moilanen et al.

(10) Patent No.: US 10,136,215 B2  
(45) Date of Patent: Nov. 20, 2018

(54) APPARATUS AND METHOD FOR SAVING ENERGY IN AN ACTIVE LOUDSPEAKER

(71) Applicant: Genelec Oy, Iisalmi (FI)

(72) Inventors: Pekka Moilanen, Iisalmi (FI); Kari Pöyhönen, Iisalmi (FI); Juho Väisänen, Iisalmi (FI)

(73) Assignee: Genelec Oy, Iisalmi (FI)

( * ) Notice: Subject to any disclaimer, the term of this patent is extended or adjusted under 35 U.S.C. 154(b) by 0 days.

(21) Appl. No.: 15/513,165

(22) PCT Filed: Sep. 24, 2015

(86) PCT No.: PCT/FI2015/050640  
§ 371 (c)(1),  
(2) Date: Mar. 22, 2017

(87) PCT Pub. No.: WO2016/046453  
PCT Pub. Date: Mar. 31, 2016

(65) Prior Publication Data  
US 2017/0311076 A1  Oct. 26, 2017

(30) Foreign Application Priority Data  
Sep. 26, 2014 (FI) .................................... 20145842

(51) Int. Cl.  
*H04R 3/00* (2006.01)  
*H04R 29/00* (2006.01)  
(Continued)

(52) U.S. Cl.  
CPC ................. *H04R 3/00* (2013.01); *G10L 19/00* (2013.01); *G10L 25/78* (2013.01); *H04R 29/001* (2013.01);  
(Continued)

(58) Field of Classification Search  
CPC .. H04R 3/00; H04R 29/001; H04R 2201/028; H04R 2420/05; H04R 2420/07;  
(Continued)

(56) References Cited

U.S. PATENT DOCUMENTS 5,822,598 A   10/1998  Lam  
8,024,055 B1  9/2011   Holmgren et al.  
(Continued)

FOREIGN PATENT DOCUMENTS

EP  2056554 A1  5/2009  
EP  2306325 A1  4/2011  
EP  2339790 A1  6/2011

Primary Examiner — Jason R Kurr  
(74) Attorney, Agent, or Firm — Seppo Laine Oy

(57) ABSTRACT

The invention relates to a method and apparatus for recognizing a digital audio signal in a system, in which at least some of the electronic components are at times in sleep or unenergized mode, in which method the digital audio signal is amplified and recognized, the amplified signal is decoded in a decoding circuit, the decoded signal is led to a signal processor for further processing and digital/analog conversion, and an audio signal is created from the analog signal. According to the invention, the amplified, undecoded signal is led directly to the signal- or microprocessor to be used and recognized, and the circuit implementing the decoder is kept in sleep mode unless a digital audio signal has been recognized.

12 Claims, 3 Drawing Sheets

(51) Int. Cl.
*H04W 52/02* (2009.01)
*G10L 25/78* (2013.01)
*G10L 19/00* (2013.01)

(52) U.S. Cl.
CPC ..... *H04W 52/029* (2013.01); *H04W 52/0229* (2013.01); *H04R 2201/028* (2013.01); *H04R 2420/05* (2013.01); *Y02D 70/00* (2018.01)

(58) Field of Classification Search
CPC ............ H04W 52/02; H04W 52/0225; H04W 52/0229; H04W 52/029; H04W 52/0287; Y02D 70/00
See application file for complete search history.

(56) References Cited

U.S. PATENT DOCUMENTS

| | | | |
|---|---|---|---|
| 9,112,989 B2 * | 8/2015 | Lee | G10L 25/78 |
| 9,806,748 B2 * | 10/2017 | Prazan | H04B 1/1615 |
| 2002/0125949 A1 * | 9/2002 | Stenberg | H03F 3/183 |
| | | | 330/250 |
| 2003/0115428 A1 | 6/2003 | Zaccarin et al. | |
| 2007/0296460 A1 | 12/2007 | Takigawa et al. | |
| 2010/0303185 A1 * | 12/2010 | Haartsen | H04W 52/0216 |
| | | | 375/362 |
| 2013/0034132 A1 | 2/2013 | Kaneko et al. | |
| 2016/0066113 A1 * | 3/2016 | Elkhatib | H04R 29/004 |
| | | | 381/56 |

* cited by examiner

APPARATUS AND METHOD FOR SAVING ENERGY IN AN ACTIVE LOUDSPEAKER

FIELD OF INVENTION

The invention relates to a method, according to the preamble to claim 1, in an active loudspeaker. The invention also relates to a circuit in an active loudspeaker.

BACKGROUND OF INVENTION

Nowadays, reduced power consumption is required in all electrical devices. Pressures to reduce electrical consumption come from both consumers and public officials. The electrical consumption of a modern electronic device can be reduced by automatically switching off those parts of the device that are not necessarily required at that precise moment. If the device is in sleep mode consuming the least possible electrical power, all other parts of the device can be switched off, except for those sensing the arrival of a signal. When a signal arrives, and it is then wished for the device to operate, this sensing component activates the other parts of the device for normal operation. Such monitoring is typically implemented using a microcontroller in a special state consuming very little power, so that a part of the electronics is required that continuously takes sufficient, but as little as possible, power, by means of which the recognition of an input signal is sent to the microcontroller controlling the system.

In the case of loudspeakers, it is increasingly common for the loudspeaker itself to contain an amplifier, which achieves advantages especially in sound quality. Additional advantages are achieved, if the signal arriving at the loudspeaker is directly digitalized, whereby the signal between the loudspeaker and the sound source, which can be a preamplifier or a direct digital sound source, will be digital and thus in practice completely distortion-free.

Methods are known, by means of which in the aforementioned situation the loudspeaker's amplifier can be put into an energy-saving sleep mode by monitoring the digital signal arriving at the loudspeaker. According to the prior art, monitoring takes place in a decoder, on the basis of the analysis of which the subsequent loudspeaker stages are controlled. However, the microcircuit implementing the decoder takes a relatively large amount of energy even when in sleep mode, compared to the continuously tightening requirements.

More specifically, in the aforementioned technique, the digital (AES/EBU coded) audio-signal receiver is typically implemented as a microcircuit or module in a wider system circuit. In its normal operating state, the microcircuit implementing the decoder requires a current of 10-30 mA (30-100 mW). When the receiver is operating, it detects the arrival of a valid digital audio signal and can notify the rest of the system when a good digital signal can be received.

The power consumption of a device can be reduced by switching off the functions not being used. If a digital audio signal is not available, the circuit receiving a digital audio signal can be kept in a sleep mode consuming little power.

SUMMARY OF THE INVENTION

The invention is intended to create a completely new type of method and apparatus for saving the electrical energy consumed by an active loudspeaker in sleep mode.

The invention is based on saving electrical energy by leading the incoming digital signal past the decoder directly to a signal processor, in which samples are taken from the digital input line at a considerably reduced clock frequency and the decoder is activated only if the predefined conditions for recognizing a signal are met.

According to one preferred embodiment of the invention, statistical methods are used to recognize an audio signal.

More specifically, the method according to the invention is characterized by what is stated in the characterizing portion of claim 1.

The apparatus according to the invention is, in turn, characterized by what is stated in the characterizing portion of claim 8.

Considerable advantages are achieved by means of some embodiments of the invention.

With the aid of the invention, a digital audio signal can be recognized using an extremely low power consumption compared to the circuit implementing the decoder being kept active continuously.

By means of the arrangement according to the invention, up-to-date tightened energy-use requirements can be met when the electronic device is in sleep mode.

Because the 10 line of the signal processor (microcontroller) can be used for recognition, the method can be easily and economically implemented.

BRIEF DESCRIPTION OF THE DRAWINGS

In the following, the invention will be examined with the aid of the accompanying figures, in which.

Figure 1:
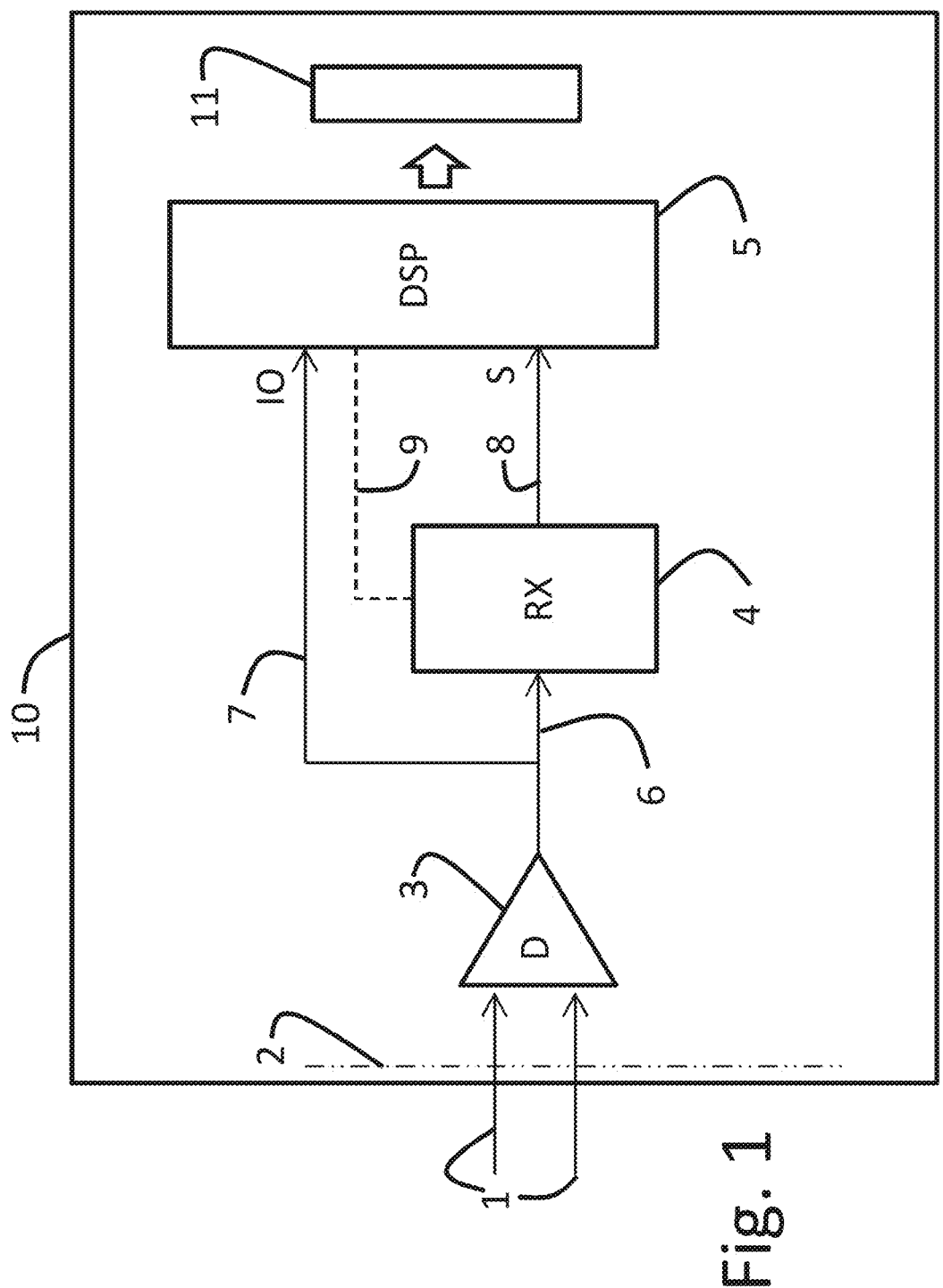
FIG. 1 shows a block diagram of one solution according to the invention.

In the present document, the following terminology is used in connection with the Figures:

1 input-signal line, brings an unamplified AES/EBU signal to the device
2 input interface, connector
3 differential receiver
4 decoder, microcircuit implementing a decoder
5 signal processor, (microprocessor)
6 undecoded signal line from the differential receiver, amplified AES/EBU line
7 control line from the differential receiver from the undecoded signal line to the IO input of the signal processor 5 (microprocessor)
8 decoded signal line from the decoder to the signal processor 5 (microprocessor), PCM audio signal (S)
9 signal line from the decoder 4 to the signal processor 5 (microprocessor)
10 active loudspeaker
11 terminal amplifiers and the loudspeaker elements connected to them
20 frame
21 sub-frame
22 audio block
23 synchronization byte
24 header field (SYNC+AUX)
30 bit
31 NRZ digital audio signal, NRZ coded data (NRZ)

DETAILED DESCRIPTION OF THE INVENTION

According to FIG. 1, an unamplified AES/EBU signal is led along the input signal line 1 to an active loudspeaker 10 containing an amplifier, to the input interface, a connector 2, which can be an optical or galvanically connected connector 2. The signal is amplified in a differential receiver 3, from which the amplified AES/EBU signal is led along the line 6 to the decoder 4 and from there as a decoded PCM audio signal (S) along the line 8 to the signal processor 5 (microprocessor), which converts the signal into an analog form to be sent to the amplifier and loudspeaker elements 11 of the terminal stage.

The arrival of a digital audio signal can be recognized, according to the prior art, by keeping the circuit 4 implementing the AES/EBU decoder of FIG. 1 active. When the circuit 4 notifies the processor 5 of the existence of the signal along the line 9, the other functions of the device can be switched on when necessary. However, the recognition of the signal created by the implementing circuit 4 of the AES/EBU decoder often takes more power than all the other components of the system combined, including keeping the signal processor 5 controlling the system in operation.

Figure 2:
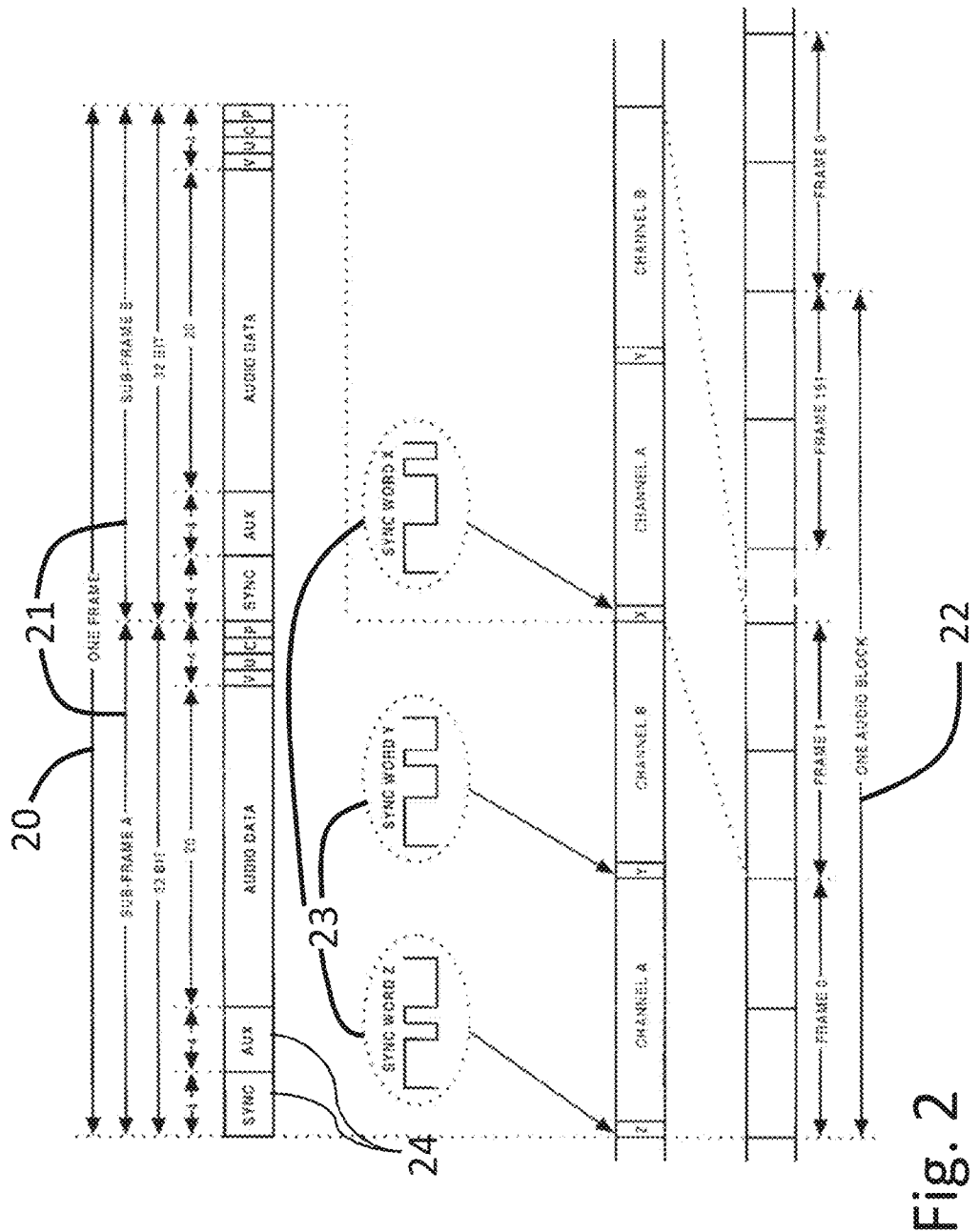
FIG. 2 shows the signal used in connection with the invention, on a time plane.
Figure 3:
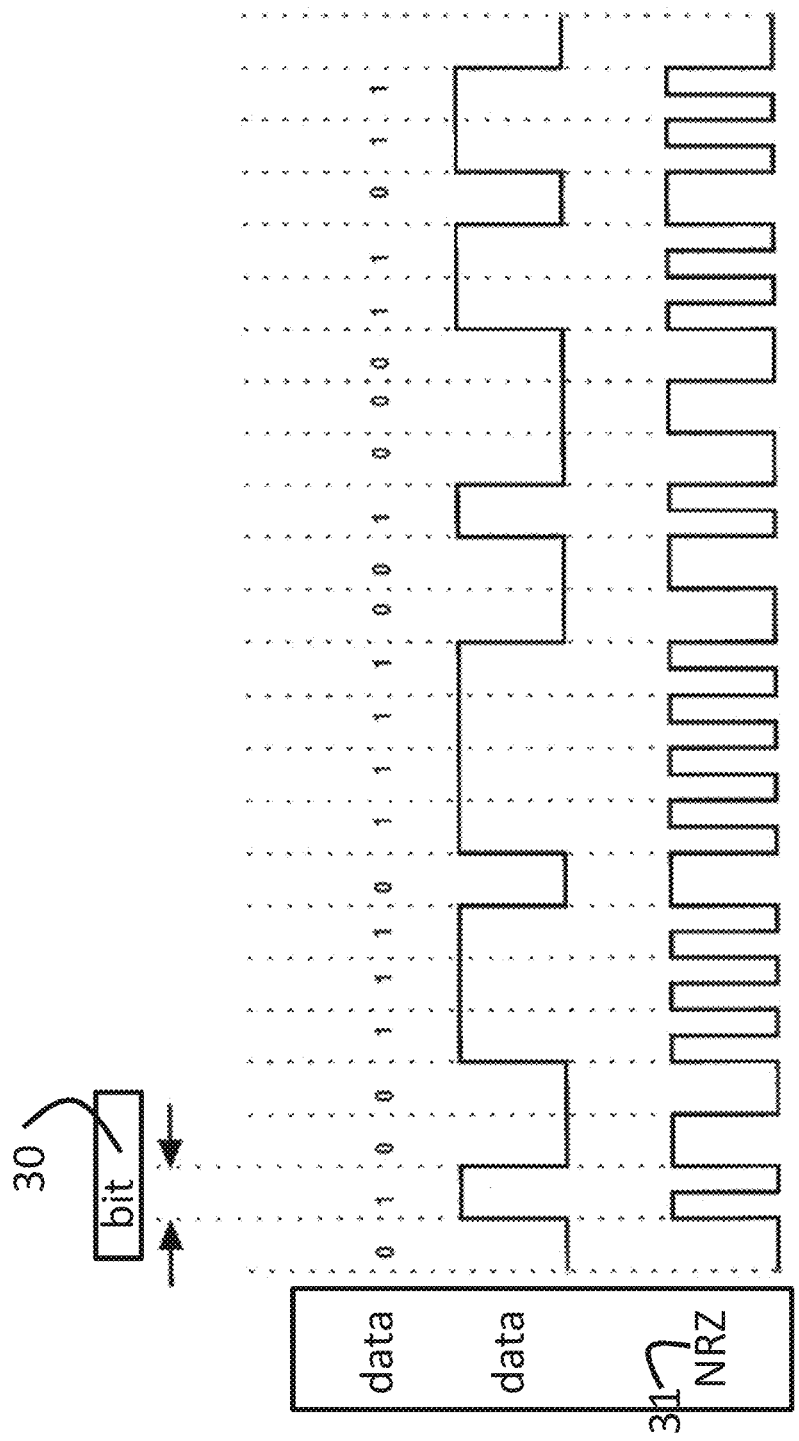
FIG. 3 shows a detail of the signal of FIG. 2.

The AES/EBU signal is an NRZ (non-return to zero) coded digital audio signal according to FIGS. 2 and 3. The bit 30 is coded using a symbol consisting of two binary states. The first state of the symbol is always different to the second state of the preceding symbol. The second state of the symbol is the same as the first state in a case in which the logical value of the bit being coded is zero (not one). If the value of the bit 30 is one, the second value of the symbol is different to the first value of the symbol. Such NRZ coding (the standard uses the term "biphase") produces a digital queue, in which changes take place either at the frequency defined by the duration of the digital bit or at twice this frequency. In the case of an AES/EBU signal, the duration of a digital bit is determined from the sample clock frequency of the audio signal. The AES/EBU frame contains 64 bits, and the frame 20 is divided into two sub-frames 21.

It is known that NRZ coded audio can be recognized by detecting a bit queue containing an NRZ signal. Deviations in the clock frequency can be detected with the aid of a PLL latch circuit contained in the digital audio receiver circuit. The header field 24 (SYNC+AUX, FIG. 2) of the AES/EBU signal contains a deviation to the normal clock frequency and it deviates from the normal clock frequency. On this basis, the start of the frame can be recognized and in addition the data contained in an individual frame can be recorded in a register. Once the data has been recorded, the frame can be recognized as an AES/EBU frame on the basis of its known structure. The method described above is relatively onerous in terms of calculation, consumes much power, and is based on the complete decoding of the AES/EBU frame.

With the aid of the invention, the existence of a digital audio signal, typically an NRZ digital audio signal 31, is recognized using very little energy. The possible audio signal is recognized from the signal line 6, before the actual receiver circuit, by the decoder 4 picking the signal from the undecoded signal line 6 through the control line 7 to the IO input of the signal processor 5.

According to the invention, the circuit 4 implementing the decoder is thus unenergized and is switched on for operation only when a signal meeting the criteria is found. To read the state of the AES/EBU input 1, the differential receiver circuit 3 (for example, audio transfer according to the AES/EBU standard uses differential coding according to the RS-422 standard) is kept switched on. The power consumption of the differential receiver 3 is extremely low. Pre-recognition is performed by reading randomly a sufficient number of times the state of the AES/EBU line 6 on the 10 line 7 of the signal processor 5 after the differential receiver 3. Reading can take place at an essentially lower frequency than the sampling frequency of the AES/EBU audio signal 1. Reading takes a sample of the level of the amplified AES/EBU signal 6 by randomly under-sampling, for example taking samples relative to the bit frequency of FIG. 3, for example, at an average of intervals of every 10 . . . 1000 bits. The method does not require a specific reading density or synchronization with the data being read, as it is based on utilizing the statistical properties of the data produced by NRZ coding. During reading, the signal processor 5 calculates the number of times that a state differing from the preceding reading is read from the line. The state is read sufficiently many times for statistical examination, for example one thousand times, and the signal processor 5 is used to make a statistical analysis from these. If there is a typical AES/EBU digital audio signal 1 on the line, 300-500 changes will normally be observed. The IO line of the microprocessor 5, for example, can be used for reading and in this way reading can be done advantageously using any processor whatever. By using the arrangement according to the invention, it is not necessary to switch on the decoder 4 to recognize an AES/EBU signal 1.

The arrangement according to the invention (pre-recognition) allows the existence of a digital audio signal to be recognized from the signal line prior to the circuit 4 implementing the decoder. The circuit 4 implementing the decoder can then be kept unenergized and activated only when a signal meeting the criteria can be recognized by the signal processor 5 arranged according to the invention, which typically operates in this mode at a very reduced clock frequency, which is, for example, $\frac{1}{100}$-$\frac{1}{1000}$ of the normal clock frequency, giving it a very low power consumption.

With the aid of the invention, the existence of an NRZ coded AES/EBU audio signal can be recognized with the aid of the statistical information described above.

As an example of the implementation of pre-recognition, the undecoded signal line 6 is read from the differential receiver 3 one thousand times at a frequency that is typically 10-1000 times lower than the sampling frequency of an NRZ digital audio signal 31. The method does not require a specific reading density or synchronization with the data being read, because it is based on utilizing the statistical properties of the data produced by NRZ coding. Based on the NRZ signal properties, the theoretical occurrence of changes in the sample queue can be considered to be 25%-50%, provided the state of the NRZ signal is read from a random point at a frequency that is not a multiple of the sample frequency.

If there is a typical AES/EBU digital audio signal on the line, 300-500 changes are typically detected per 1000 readings (30-50%). Usually, 0-9 changes per 1000 readings are found from the unconnected cable. If a sufficient number of changes are detected relative to the readings, a digital audio signal is stated to have been found. More specifically, if a typical number of changes are detected relative to the readings, it is probable that the signal is an NRZ coded signal. There are then sufficient grounds for activating the device's AES/EBU decoder, and with it obtaining accurate information that the NRZ signal is an AES/EBU coded audio signal.

In summary, the existence of a digital NRZ coded audio signal is recognized in two stages. First of all by a low-energy consuming calculation method based on a statistical property and only then more precisely using an AES/EBU receiver circuit. The AES/EBU signal is recognized by reading the states of the digital signal asynchronously and randomly.

The apparatus is typically reset to sleep mode in such a way that, if, after a specific detection time, a signal does not come (i.e. the signal is absent for the whole time) a counter is set to determine the time that has elapsed and, if the time exceeds a predefined time limit, for example 1 minute, then sleep mode starts. If the apparatus detects an incoming signal, the counter is reset and counting begins again from the moment that the signal vanishes.

In the present application, the term sleep mode refers to a state of an electrical circuit, in which it uses clearly less energy than in normal operation, but in which it can receive and interpret signals to the extent that is essential to wake the device from the sleep mode. European Union legislation, for example, requires certain devices to consume less than 0.5 W of electrical power when in sleep mode. The no-load power consumption of such a device can be typically 5 . . . 30 W. In sleep mode, the device must thus use less than 10% of its normal no-load power consumption.

In the present application, the term unenergized refers to such a state of the electrical circuit in which it uses less than 0.1% of its normal electrical power consumption.

The term a low-frequency operating state refers in this connection to a state of the micro- or signal-processor, in which its operating frequency is reduced to be clearly lower, for example, less than 30% of its normal operating frequency and preferably less than 1% of its normal operating frequency.

The invention claimed is:

1. A method for recognizing a digital audio signal in a system, in which at least some electronic components are at times in a sleep or unenergized mode, said method comprising:
    amplifying and recognizing the digital audio signal,
    decoding, in a circuit implementing a decoder, the amplified digital audio signal,
    leading the decoded signal to a signal processor or microprocessor for further processing and digital/analog conversion, and
    creating an audio signal from the converted analog signal, wherein
    the amplified, undecoded digital audio signal is led directly to the signal-processor or microprocessor to be used and recognized, and
    the circuit implementing the decoder is kept in sleep mode, unless a digital audio signal has been recognized.

2. The method according to claim 1, wherein recognition is performed by taking samples from the undecoded digital audio signal at a sampling frequency that is considerably lower than its bit frequency and which is preferably less than $1/10$ of the signal's bit frequency.

3. The method according to claim 1, wherein without a recognized signal, the signal processor is operated at a clock frequency that is preferably $1/10$-$1/1000$ of the signal processor's normal frequency.

4. The method according to claim 1, wherein the amplified, undecoded digital audio signal is recognized by reading the states of the digital audio signal asynchronously and randomly.

5. The method according to claim 4, wherein the existence of a digital signal is recognized, if changes are ascertained from more than 20% of the readings.

6. The method according to claim 1, wherein the amplified, undecoded digital audio signal is recognized by reading the amplified, undecoded signal at a random point at a frequency that is not a multiple of the sampling frequency.

7. The method according to claim 1, wherein the digital signal is an AES/EBU signal.

8. An apparatus for recognizing a digital audio signal in a system, in which at least some electronic components are at times in a sleep or unenergized mode, the apparatus comprising means for:
    amplifying and recognizing a digital audio signal,
    decoding the amplified digital audio signal,
    leading the decoded signal (S) to a signal- or microprocessor for further processing and digital/analog conversion, and
    creating an audio signal from the analog signal,
    the apparatus further comprising means for:
    leading the amplified, undecoded signal directly to be used and recognized by the signal processor, and
    keeping the circuit implementing the decoder in sleep mode, unless a digital audio signal has been recognized.

9. The apparatus according to claim 8, wherein the apparatus further comprises means for performing recognition by taking samples from an undecoded signal at a sampling frequency considerably lower than its bit frequency, which is preferably less than $1/10$ of the signal's bit frequency.

10. The apparatus according to claim 8, wherein the apparatus further comprises means, by which, without a recognized signal, the signal processor can be operated at a clock frequency that is preferably $1/10$-$1/1000$ of the signal processor's normal frequency.

11. The apparatus according to claim 8, wherein the apparatus further comprises means for recognizing an amplified, undecoded signal by reading states of the digital signal asynchronously and randomly.

12. The apparatus according to claim 8, wherein the apparatus further comprises means for recognizing an amplified, undecoded signal by reading the signal at a random point at a frequency that is not a multiple of the sampling frequency.

* * * * *